United States Patent [19]
Kelly

[11] Patent Number: 5,251,865
[45] Date of Patent: Oct. 12, 1993

[54] MULTIPURPOSE AUTOMOTIVE TRANSMISSION MOUNT

[76] Inventor: H. L. Kelly, 1966 E. 1st St., Tempe, Ariz. 85281

[21] Appl. No.: 865,453

[22] Filed: Apr. 9, 1992

[51] Int. Cl.$^5$ ............................................. F16M 13/00
[52] U.S. Cl. .................................... 248/634; 180/292; 180/312; 267/141.5; 267/153; 267/292
[58] Field of Search ............... 248/634, 674, 676, 678, 248/636; 267/153, 141.2, 141.5, 292; 180/292, 312

[56] References Cited

U.S. PATENT DOCUMENTS

| 4,252,301 | 2/1981 | Saito | 267/141.5 |
| 4,402,380 | 9/1983 | Strone | 180/292 |
| 4,703,828 | 11/1987 | Mertens | 180/312 X |
| 5,090,502 | 2/1992 | Inoue et al. | 180/312 |
| 5,129,479 | 7/1992 | Fujii et al. | 267/153 X |

FOREIGN PATENT DOCUMENTS 2071265  9/1981  United Kingdom ............. 267/141.5

Primary Examiner—Ramon O. Ramirez
Attorney, Agent, or Firm—Antonio R. Durando; Harry M. Weiss

[57] ABSTRACT

A transmission mount that consists of a rubber core incorporating a top plate for attachment to the transmission housing and a bottom plate for attachment to the supporting cross-arm in the frame of the vehicle. The top plate features two slots designed to match the geometry of the mounting bolts of at least 93 different transmissions; the bottom plate features three threaded apertures designed to accommodate the mounting bolts in the standard cross-arms used to support them; and the overall shape of the mount is designed to fit within the space allowed by the particular structure of each transmission/cross-arm assembly.

7 Claims, 1 Drawing Sheet

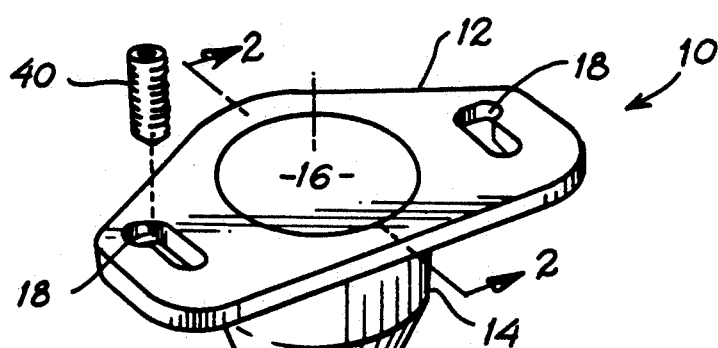
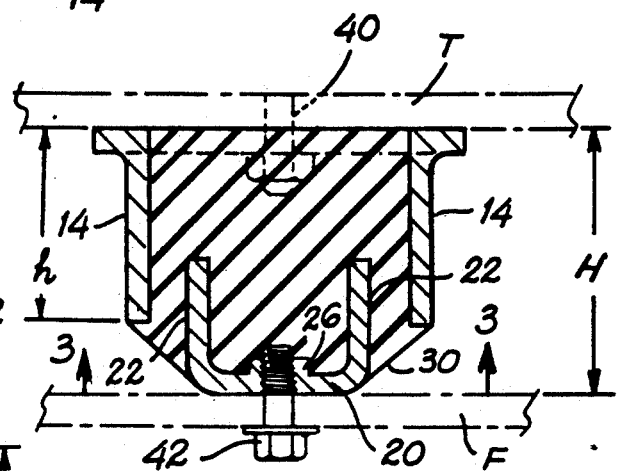
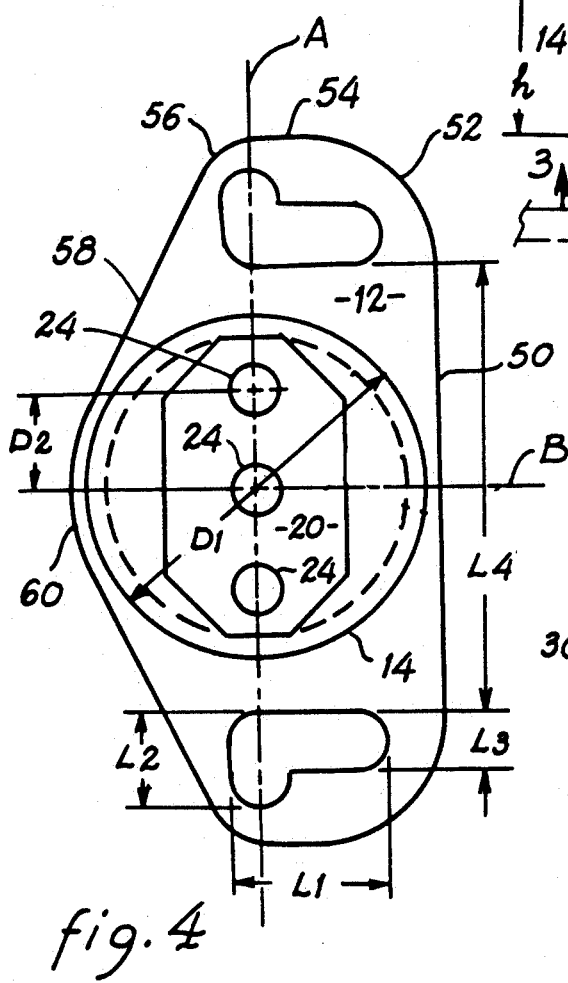
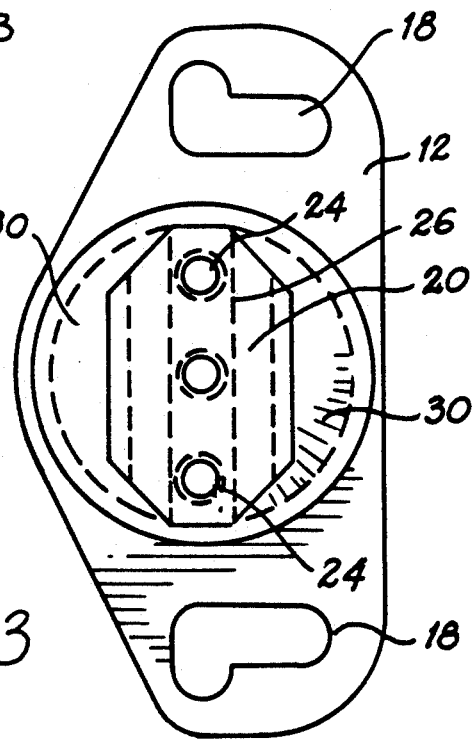
fig. 1
fig. 2
fig. 3
fig. 4

MULTIPURPOSE AUTOMOTIVE TRANSMISSION MOUNT

BACKGROUND OF THE INVENTION

1. Field of the Invention

This invention is related to the general field of mounts for automotive applications. In particular, the invention provides a new transmission mount suitable for installing a variety of different transmission units that otherwise would require individually designed mounts.

2. Description of the Prior Art

Automotive transmissions are normally installed in trucks and automobiles by mounting them on a cross-arm attached to the frame of the vehicle. A transmission mount, normally consisting of two horizontal metal plates attached to a rubber-filled core, is inserted between the bottom of the transmission housing and the top of the cross-arm to provide support and shock-absorption for the transmission. In most vehicles the top plate of the mount is secured to the bottom of the transmission's housing by means of two perforations precisely spaced apart and sized to receive corresponding studs or bolts protruding down from the transmission. Similarly, the bottom plate of the mount features one, two or three studs or threaded holes designed to match corresponding apertures or bolts, respectively, in the top of the cross-arm.

Thus, the mount is first fastened to the top of the cross-arm by securing its bottom plate to it; the transmission is then installed on top of the mount and secured to its top plate, as well as to other parts of the vehicle and of the drive-train. Once so assembled, the transmission is firmly braced to and supported by the cross-arm through the rubber mount so installed, which also provides shock absorption to alleviate the effects of vibrations during the operation of the vehicle.

This kind of mount has been used for decades by the automotive industry and its effectiveness and reliability are proven. Unfortunately, though, little standardization has been implemented by the various manufacturers and every transmission requires a mount designed specifically for that transmission. Although the difference between two mounts is sometimes minimal, such as a few thousands of an inch in the distance between the apertures in the top plate, it is sufficient to preclude the use of the same mount for two different transmissions. This greatly increases the cost of manufacture of transmission mounts, as well as the cost of the inventory that service centers are required to maintain. Therefore, there exists a need for a mount that can be used for installing many transmission models.

BRIEF SUMMARY OF THE INVENTION

The main objective of this invention is the development of a transmission mount suitable for installing a great number of automotive transmissions as a replacement for a corresponding number of individual mounts currently used in the industry. In addition, an objective of the invention is a mount that can be manufactured economically by using commercially available materials, components and techniques.

According to these and other objectives, the transmission mount of the present invention consists of a rubber core incorporating a top plate for attachment to the transmission housing and a bottom plate for attachment to the supporting cross-arm in the frame of the vehicle. The top plate features two slots designed to match the geometry of the mounting bolts of at least 93 different transmissions; the bottom plate features three threaded apertures designed to accommodate the mounting bolts in the standard cross-arms used to support them; and the overall shape of the mount is designed to fit within the space allowed by the particular structure of each transmission/cross-arm assembly.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1 is a perspective view of the automotive transmission mount of this invention.

FIG. 2 is a cross-sectional view of the same mount taken along line 2—2 in FIG. 1.

FIG. 3 is a bottom view of the mount of the invention taken along line 3—3 in FIG. 2.

FIG. 4 is a schematic drawing used to specify the dimensions of critical structures of the invention.

DETAILED DESCRIPTION OF THE INVENTION

This invention lies in the realization that a single mount could be designed to accommodate the requirements of multiple individual mounts currently used by the automotive industry for the installation of different transmissions. By focusing on the particular geometry requirements of a certain number of specific mounts, I was able to design a single mount suitable for installing at least 93 different transmissions that normally can only be installed by using a different factory-designed mount for each unit.

Referring to the drawings, wherein like parts are referenced throughout with like numerals and symbols, FIG. 1 shows a perspective view of the mount 10 of the invention. The device comprises a metallic top plate 12 generally shaped like the top plate of many conventional transmission mounts. The top plate 12 is rigidly attached to (or is an integral part of) a metallic cylinder 14 protruding downward approximately from the center of the top plate, which features a round opening 16 coextensive with the inside diameter of the cylinder 14. The top plate 12 features two L-shaped slots 18 for receiving matching bolts 40 used to secure it to the bottom of a transmission housing.

As illustrated in the cross-sectional view of FIG. 2 and the bottom view of FIG. 3, the device also comprises a separate metallic bottom plate 20, which includes two orthogonal side portions 22 (protruding upward) for a U-channel shaped configuration. The bottom plate 20 features three vertical threaded bolt holes 24 drilled through a reinforcing rib 26 for receiving matching bolts used to secure the plate to the cross-arm of the vehicle's frame to support the transmission/mount assembly. The structures of the top and bottom plates are bonded and held together by a core 30 made of rubber or equivalent resilient material molded inside the cylinder 14 of the top plate and around the side portions 22 of the bottom plate. Thus, the rubber material completely fills the interior of the cylinder 14 and envelopes the two side portions 22, forming a partly conical structure converging to the bottom plate 20 (as seen in FIG. 1). Of course, the lower face of the bottom plate and the threaded bolt holes 24 must be left open for receiving fastening bolts 42 (as seen in FIG. 2). Because the metal structures of the top and bottom plates are separated by rubber, the resulting mount 10 affords shock absorption between the two plates, as required for normal automotive use where it is desirable to insulate the transmission T from vibrations in the frame, and therefore in the cross-arm F, of the vehicle, and vice versa.

My invention lies in the specific dimensions of some parts of the mount 10 described above, which render it suitable for use with at least 93 vehicles produced by the General Motors Company of America. Referring particularly to the schematic drawing of FIG. 4, a main axis A and a minor axis B passing through the center of gravity of the top plate 12 are defined for reference and clarity of exposition. Given the vertical symmetry of the device, as seen bottom view in FIG. 3 and illustrated in FIG. 4, whenever specific dimensions of only one vertical half are described, it is understood that the same dimensions apply to the other half.

Although not critical to the invention, in the preferred embodiment the top plate 12 is approximately 5.25 inches long (in the direction of its main axis A) and 2.75 inches wide (in the direction of its minor axis B), with an irregular oblong shape. Referring to the top half in FIG. 4 (which is not drawn to scale), the shape of the perimeter can be described as comprising a first linear segment 50 connected to a first round segment 52 with a radius of approximately 1.0 inches, which in turn is connected to a second linear segment 54 at a 90-degree angle with the first linear segment 50. A second round segment 56, having a radius of approximately 0.5 inches, connects the second linear segment 54 to a third linear segment 58 at an angle of approximately 26.5 degrees with the first linear segment 50. The third linear segment 58 is then followed by a fourth round segment 60 having a radius of approximately 1.375 inches, thus completing the description of the perimeter of the top half. The bottom half of the plate is the mirror image of the top half.

The dimensions of the L-shaped slots 18 contained in each half of the top plate 12 are critical to the multi-purpose function of the mount 10. Each slot consists of a longer leg 1.203 inches long (L1 in FIG. 4), disposed in parallel to the minor axis B, and a shorter leg 0.726 inches long (L2), disposed along the main axis A and facing outwardly. Both legs are 0.453 inches wide (L3), as seen in FIG. 4. The two slots are separated by a distance of 3.298 inches (L4) between the inside edge of the longer legs.

The cylinder 14 is preferably sized with an outside diameter (D1) approximately 2.58 inches and a height h (seen in FIG. 2) between 1.400 and 1.460 inches for fitting within the space between the transmission T and the supporting cross-arm F for which it is intended. The cylinder is preferably an integral part of the top plate 12 (or it may be rigidly attached to it) with its longitudinal axis along the center of gravity of the plate (that is, orthogonal to the intersection of the two reference axes A and B). Given the average thickness of the steel used in the construction of automotive mounts, this size for cylinder 14 is enough to envelop the side portions 22 of the bottom plate 20, as illustrated in FIGS. 2 and 3. The total height of the mount 10, referenced as H in FIG. 2, can vary between 1.937 and 1.960 inches. It cannot be less to avoid tension on the rubber core, nor more to be able to fit in all intended vehicle. The shape of the various parts and their sizes ensure that there is sufficient open space on the underside of the top plate 12 to fasten bolts or nuts to the slots 18 of the top plate and to fit the mount in the space available in all of the transmission assemblies for which it is designed. Although the dimension of the bottom plate 20 is not critical, it must be sufficiently large to accommodate the three bolt holes 24, which must be positioned horizontally on the same vertical plane passing through the main axis A of the top plate. These holes are standard $\frac{3}{8}$-16 bolt sizes with centers 0.758 inches apart, the center bolt hole being directly below the intersection of the two axes A and B of the top plate. Thus D2, the bolt holes 24 are all vertically aligned with the short legs of the slots 18.

As mentioned above, the specific shape and size of the mount of this invention are such that it can be used as a substitute for the transmission mounts now used for 93 specific GM transmission assemblies. Listed by original equipment manufacturer's part number (OEM number), these are as follows:

OEM Number 2143
2268
2288
2360
2378
2391
2392
2393
2394
2508
2513
2514
2515
2531

Therefore, the present invention describes a single transmission mount that needs to be stocked in substitution of all of these different parts. This could result in a greater number of this particular kind of mount being manufactured instead of fewer number for each of the models it substitutes. Therefore, it is expected that production costs could be reduced by the attendant simplification. In addition, considerable inventory and warehousing savings can also be expected, all of which in turn would result in savings to the consumer.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein, but is to be accorded the full scope of the claims so as to embrace any and all equivalent apparatus and methods.

I claim:

1. An automotive transmission mount for bracing a transmission to a supporting cross-arm of a vehicle's frame, comprising:

(a) a top plate having a main longitudinal axis and a minor transverse axis, and having two L-shaped slots, each consisting of a longer leg 1.203 inches long, disposed in parallel to the minor axis of the top plate, and of a shorter leg 0.726 inches long, disposed along the main axis of the top plate; wherein both of said legs are 0.453 inches wide, and the slots are separated by a distance of 3.298 inches and are positioned with the shorter leg facing outwardly;

(b) a cylinder attached to said top plate in orthogonal position thereto, said cylinder having an outside diameter of approximately 2.58 inches and a height between 1.400 and 1.460 inches;

(c) a U-channel shaped bottom plate having side portions facing toward the interior of mount, said bottom plate being sufficiently large to accommodate three vertical threaded bolt-holes; wherein said bolt-holes are in vertical alignment with the short legs of said L-shaped slots, are standard $\frac{3}{8}$-16 bolt sizes with centers 0.758 inches apart, and wherein the center bolt-hole is in vertical alignment with the center of gravity of said top plate; and (d) a core made of resilient material molded inside said cylinder attached to the top plate and around the side portions of said bottom plate, whereby the resilient material completely fills the interior of the cylinder, envelopes said two side portions and converges to the bottom plate in partly conical shape; wherein the total height of the mount can vary between 1.937 and 1.960 inches.

2. The mount described in claim 1, further comprising a reinforcing rib in said bottom plate.

3. The mount described in claim 1, wherein said top plate is approximately 5.25 inches long and approximately 2.75 inches wide.

4. The mount described in claim 3, wherein said top plate has an irregular oblong shape, half the perimeter of which can be described as comprising a first linear segment connected to a first round segment with a radius of approximately 1.0 inches, which in turn is connected to a second linear segment disposed at a 90-degree angle with the first linear segment; said second linear segment being connected to a second round segment, having a radius of approximately 0.5 inches and connecting the second linear segment to a third linear segment disposed at an angle of approximately 26.5 degrees with the first linear segment; the third linear segment being followed by a fourth round segment having a radius of approximately 1.375 inches; and the other half of the perimeter being the mirror image of the first half.

5. The mount described in claim 1, wherein said top plate, said cylinder and said bottom plate are made of metal.

6. The mount described in claim 1, wherein said top plate and said cylinder are constructed in a single integral piece.

7. The mount described in claim 1, wherein said core is made of rubber.

* * * * *